United States Patent
He et al.

(10) Patent No.: US 12,513,024 B2
(45) Date of Patent: Dec. 30, 2025

(54) LOW COMPLEXITY CARRIER FREQUENCY OFFSET ESTIMATION ALGORITHM USING KNOWN SYMBOLS

(71) Applicant: SAMSUNG ELECTRONICS CO., LTD., Suwon-si (KR)

(72) Inventors: Ziming He, Cambridge (GB); Fei Tong, Cambridge (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 417 days.

(21) Appl. No.: 18/083,059

(22) Filed: Dec. 16, 2022

(65) Prior Publication Data

US 2024/0214244 A1 Jun. 27, 2024

(51) Int. Cl.
*H04L 25/02* (2006.01)
*H04L 27/26* (2006.01)

(52) U.S. Cl.
CPC ...... *H04L 25/0222* (2013.01); *H04L 25/0224* (2013.01); *H04L 27/2657* (2013.01)

(58) Field of Classification Search
CPC .......... H04L 25/0222; H04L 27/2657
See application file for complete search history.

(56) References Cited

U.S. PATENT DOCUMENTS

| | | | |
|---|---|---|---|
| 7,039,131 B2 | 5/2006 | Banerjea | |
| 7,515,567 B2 | 4/2009 | Min et al. | |
| 7,944,999 B2 | 5/2011 | Ma et al. | |
| 8,611,472 B2 | 12/2013 | Mishra et al. | |
| 9,654,308 B2 | 5/2017 | Li et al. | |
| 9,935,794 B1 | 4/2018 | Cao et al. | |
| 10,461,982 B2 | 10/2019 | Jos et al. | |
| 2008/0303508 A1* | 12/2008 | Kwak | H04L 27/2657 324/76.52 |
| 2010/0008216 A1* | 1/2010 | Li | H04L 27/2662 370/344 |
| 2016/0142227 A1* | 5/2016 | Li | H04L 27/0014 375/295 |
| 2018/0097593 A1* | 4/2018 | Da Silva | H04L 1/0083 |

OTHER PUBLICATIONS

Umberto Mengali and M. Morelli, "Data-Aided Frequency Estimation for Burst Digital Transmission", IEEE Transactions on Communications, vol. 45, No. 1, Jan. 1997, (4 pages total).

* cited by examiner

*Primary Examiner* — Zhiren Qin
(74) *Attorney, Agent, or Firm* — Sughrue Mion, PLLC

(57) ABSTRACT

A communication device, including a receiver configured to receive a signal comprising a plurality of training symbols and a data symbol; and at least one processor configured to: select, from among the plurality of training symbols, a first training symbol and a second training symbol based on a first parameter and a second parameter; obtain a first symbol difference corresponding to the first training symbol, and a second symbol difference corresponding to the second training symbol; estimate a carrier frequency offset based on the first symbol difference and the second symbol difference; obtain a compensated data symbol corresponding to the data symbol based on the estimated carrier frequency offset; and demodulate and decode the compensated data symbol to obtain decoded data.

20 Claims, 11 Drawing Sheets

LOW COMPLEXITY CARRIER FREQUENCY OFFSET ESTIMATION ALGORITHM USING KNOWN SYMBOLS

BACKGROUND

1. Field

Apparatuses and methods consistent with embodiments relate to wireless communication, and more particularly to carrier frequency offset (CFO) estimation.

2. Description of Related Art

Carrier frequency offset (CFO) estimation is an important function in wireless communication receivers to achieve high throughput. CFO estimation is usually based on training symbols, which may be for example preamble symbols. Estimation performance and computational complexity are two important factors for designing a commercial solution.

Several low-complexity CFO estimation algorithms have been proposed. However, the complexity of these algorithms may still be undesirably high, and the estimation performance of these algorithm may degrade when short training symbols are utilized. Therefore, there exists a need for a method for performing CFO estimation that has an improved trade-off between estimation performance and complexity.

SUMMARY

Provided are devices and methods for performing CFO estimation having an improved trade-off between estimation performance and computational complexity, according to embodiments.

In accordance with an aspect of the disclosure, a communication device includes a receiver configured to receive a signal comprising a plurality of training symbols and a data symbol; and at least one processor configured to: select, from among the plurality of training symbols, a first training symbol and a second training symbol based on a first parameter and a second parameter; obtain a first symbol difference corresponding to the first training symbol, and a second symbol difference corresponding to the second training symbol; estimate a carrier frequency offset based on the first symbol difference and the second symbol difference; obtain a compensated data symbol corresponding to the data symbol based on the estimated carrier frequency offset; and demodulate and decode the compensated data symbol to obtain decoded data.

In accordance with an aspect of the disclosure, a device for estimating carrier frequency offset includes a memory; and at least one processor configured to: obtain a signal comprising a plurality of training symbols and a data symbol; estimate the carrier frequency offset based on parameters which specify a minimum symbol distance and a maximum symbol distance used to determine at least one from among a signal correlation corresponding to the plurality of training symbols, and a phase difference corresponding to the plurality of training symbols; obtain a compensated data symbol corresponding to the data symbol based on the estimated carrier frequency offset; and demodulate and decode the compensated data symbol to obtain decoded data.

In accordance with an aspect of the disclosure, a communication method for operating a communication device, the communication method is performed by at least one processor and includes receiving a signal comprising a plurality of training symbols and a data symbol; selecting, from among the plurality of training symbols, a first training symbol and a second training symbol based on a first parameter and a second parameter; obtaining a first symbol difference corresponding to the first training symbol, and a second symbol difference corresponding to the second training symbol; estimating a carrier frequency offset based on the first symbol difference and the second symbol difference; obtaining a compensated data symbol corresponding to the data symbol based on the estimated carrier frequency offset; and demodulating and decoding the compensated data symbol to obtain decoded data.

In accordance with an aspect of the disclosure, a method for estimating carrier frequency offset is performed by at least one processor and includes obtaining a signal comprising a plurality of training symbols and a data symbol; estimating the carrier frequency offset based on parameters which specify a minimum symbol distance and a maximum symbol distance used to determine at least one from among a signal correlation corresponding to the plurality of training symbols, and a phase difference corresponding to the plurality of training symbols; obtaining a compensated data symbol corresponding to the data symbol based on the estimated carrier frequency offset; and demodulating and decoding the compensated data symbol to obtain decoded data.

DETAILED DESCRIPTION

Embodiments relate to devices and methods for performing carrier frequency (CFO) estimation. Embodiments may be associated with an acceptable trade-off between estimation performance and computational complexity. Embodiments may be used in communications schemes in which a block of transmit symbols is known at the receiver. For example, embodiments may relate to CFO estimation based on training symbols, which may be for example symbols included in a preamble portion of a received frame. Embodiments may be applied in any communication device, system, or method in which CFO error is relevant to the communication throughput. For example, embodiments may be applied in any communication device, system, or method which uses a time domain modulation scheme.

Figure 1:
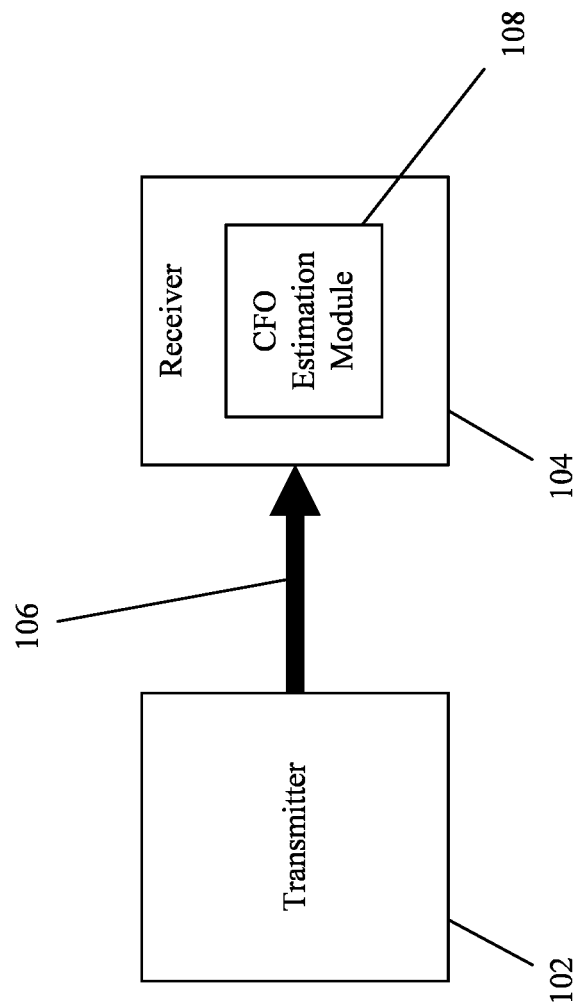
FIG. 1 is a block diagram of a communication system, according to embodiments.

FIG. 1 is a block diagram of a communication system 100, according to embodiments. As shown in FIG. 1, a transmitter 102 and a receiver 104 may communicate using a communication channel 106. In embodiments, the communication channel 106 may be a wired or wireless communication channel. In embodiments, when a CFO is present between the transmitter 102 and the receiver 104, there may be significant degradation in performance. For example, the undesirable degradation in performance may result in an inability to demodulate and decode signals received over the communication channel 106. In order to correct for the presence of a CFO, an accurate estimate of the CFO may be used. Therefore, in embodiments, the receiver 104 may include a CFO estimation module 108, which may be used to perform CFO estimation on signals received over the communication channel 106.

Although the communication system 100 is illustrated as including the transmitter 102 and the receiver 104, embodiments are not limited thereto. For example, one or more of the transmitter 102 and the receiver 104 may be replaced with a transceiver capable of performing both transmitting and receiving of signals. In embodiments, the transceiver may include a CFO estimation module 108 which may be used to perform CFO estimation when the transceiver operates in a receiving mode. In addition, in embodiments the communication system 100 may include multiple transmitters, receivers, and transceivers which may transmit and receive signals using the communication channel 106.

Figure 2:
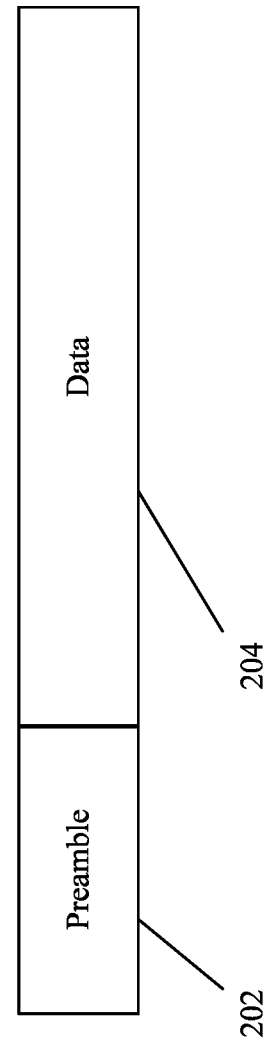
FIG. 2 is a block diagram of a packet used in wireless communication, according to embodiments.

FIG. 2 is a block diagram of a packet 200 that may be used by the communication system 100. The packet 200 may include a preamble portion 202 and a data portion 204. The preamble portion 202 may be extracted, and a plurality of preamble symbols may be obtained and used by the CFO estimation module 108 to perform CFO estimation. In embodiments, the preamble symbols may correspond to, for example, synchronization fields and control fields of the packet. In embodiments, the preamble symbols used for CFO estimation may be referred to as training symbols. In embodiments, after the CFO estimation module 108 obtains the estimated CFO based on the preamble portion 202, the receiver 104 may obtain a compensated version of the data portion 204, and then demodulate and decode the data portion to obtain decoded data corresponding to the received signal.

In embodiments, after receiving a signal from the transmitter 102 over the communication channel 106, the receiver 104 may perform preliminary processing of the signal, which may include for example timing estimation and coarse CFO estimation. After this preliminary processing is performed, the CFO estimation module 108 may extract a block of received training symbols $r_l$, $l \in [1, L]$, where L represents a number of the symbols $r_l$. In embodiments, the CFO estimation module 108 may know the transmitted version of the training symbols, which may be referred to as expected training symbols $p_l$.

By removing the expected training symbols $p_l$ from the received training symbols $r_l$, a plurality of symbol differences $z_l$ may be obtained, as shown for example in Equation (1) below:

$$z_l = r_l / p_l \tag{1}$$

After the symbol differences $z_l$ are obtained, CFO estimation may be performed based on some or all of the symbol differences $z_l$. Ideally, without other impairments, and without the impact of transmit and receive filtering, the symbol differences $z_l$ can be expressed according to Equation (2) below:

$$z_l = e^{j\omega_c l} \tag{2}$$

In Equation (1) above, $\omega_c$ represents the true CFO to be estimated.

CFO estimation may be performed using a number of different estimators, for example, the Fitz estimator, the Luise and Reggiannini (L&R) estimator, and Mengali & Morelli (M&M) estimator, examples of which are described in U. Mengali and M. Morelli, "Data-Aided Frequency Estimation for Burst Digital Transmission," *IEEE Trans. Commun.*, vol. 45, no. 1, pp. 23-25, January 1997, the contents of which is incorporated herein by reference in its entirety. The Fitz estimator, the L&R estimator, and the M&M estimator may use Equation (3) below to perform a pre-calculation of a signal differential $R_m$.

$$R_m = \frac{1}{L-m}\sum_{l=m+1}^{L} z_l z_{l-m}^*, \; m \in [1, M] \tag{3}$$

In Equation (3) above and in the equations below, $R_m$ represents a signal differential, and m represents a symbol distance between the symbol corresponding to z and the symbol corresponding to $z_{l-m}$. In addition, in Equations (3)-(7), M may refer to a design parameter set to M=[L/2], in order maximize CFO estimation performance.

The Fitz estimator may be used to obtain an estimated CFO $\hat{\omega}_c$ according to Equation (4) below:

$$\hat{\omega}_c = \frac{2}{M(M+1)}\sum_{m=1}^{M} \arg\{R_m\} \tag{4}$$

The L&R estimator may be used to obtain the estimated CFO $\hat{\omega}_c$ according to Equation (5) below:

$$\hat{\omega}_c = \frac{2}{M+1}\arg\left\{\sum_{m=1}^{M} R_m\right\} \tag{5}$$

The M&M estimator may be used to obtain the estimated CFO $\hat{\omega}_c$ according to Equation (6) and Equation (7) below:

$$\hat{\omega}_c = \sum_{m=1}^{M} w_m(\arg\{R_m\} - \arg\{R_{m-1}\}) \tag{6}$$

$$w_m \triangleq \frac{3[(L-m)(L-m+1) - M(L-M)]}{M(4M^2 - 6ML + 3L^2 - 1)} \text{ and } \arg\{R_0\} \triangleq 0. \tag{7}$$

As can be seen above, CFO estimation according to the Fitz estimator, the L&R estimator, and the M&M estimator as described above may include calculations that are performed on a symbol-by-symbol basis. As a result, the Fitz estimator, the L&R estimator, and the M&M estimator may result in a CFO estimation process that has a relatively high complexity.

In contrast, CFO estimation according to other estimators may include calculations that are performed on subgroups of the symbols. For example, one such estimator, referred to herein as a Broadcom estimator, is described in U.S. Pat. No. 7,515,567, the contents of which are incorporated by reference in its entirety.

The Broadcom estimator may be used to obtain an estimated CFO $\hat{\omega}_c$ according to Equation (8) below:

$$\hat{\omega}_c = \frac{1}{(G-1)B} \sum_{g=0}^{G-2} \varphi_g \quad (8)$$

In Equation (8), g represents an index, $$G = \left\lfloor \frac{L}{B} \right\rfloor$$

represents the number of subgroups into which the training symbols are divided, and B represents the number of symbols in each sub-group. In addition, the phase difference $\varphi_g$ may be determined based on Equations (9) and (10) below:

$$\varphi_g = \arg\{Z_{g+1} Z_g^*\}, g \in [0, G-2] \quad (9)$$

$$Z_g = \frac{1}{B} \sum_{i=1}^{B} z_{gB+i}, g \in [0, G-1] \quad (10)$$

Figure 3:
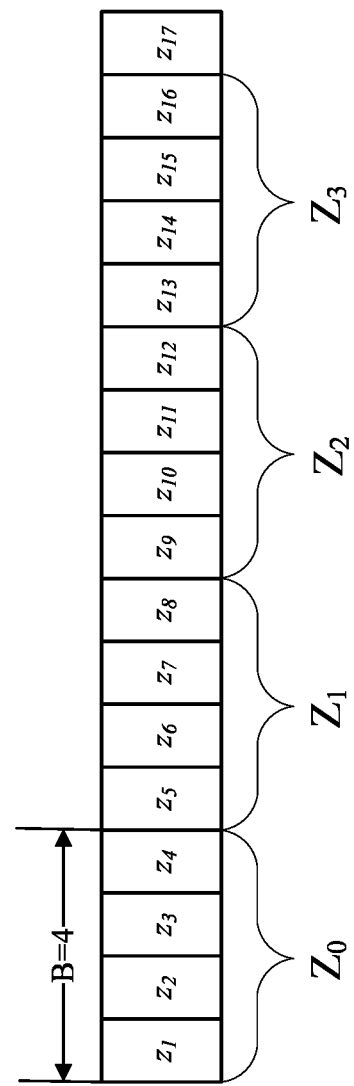
FIG. 3 is a block diagram illustrating a process of selecting symbols to be used for performing carrier frequency offset estimation, according to embodiments.

FIG. 3 is a diagram illustrating a process of selecting symbols to be used for CFO estimation, according to embodiments. In embodiments, FIG. 3 may correspond to the Broadcom estimator discussed above. For example, FIG. 3 shows a plurality of symbol differences $z_1$ through $z_{17}$ which may correspond to a plurality of received training symbols $r_1$ through $r_{17}$ obtained from a preamble portion 202 extracted from a signal received over communication channel 106. As can be seen in FIG. 3, when B is equal to 4, the plurality of symbol differences $z_1$ through $z_{17}$ may be divided into four subgroups $Z_0$ through $Z_3$, and the CFO can be estimated based on the four subgroups.

Although the Broadcom estimator may allow CFO estimation having a lower complexity than the Fitz estimator, the L&R estimator, and the M&M estimator, the estimation performance may be limited by the size and number of the subgroups. For example, the estimation performance of the Broadcom estimator may degrade when a small number of training symbols are used, because the small number of training symbols may limit the number of subgroups that may be used for CFO estimation. In addition, the estimation performance of the Broadcom estimator may degrade when the number of training symbols is not easily divisible by the size of the subgroups.

Therefore, embodiments may provide an improved trade-off between estimation performance and computational complexity by using design parameters $M_{min}$ and $M_{max}$ in the CFO estimation process.

For example, embodiments may relate to a symbol-by-symbol CFO estimation technique, which may use design parameters $M_{min}$ and $M_{max}$, which may be used to select a useful signal correlation $R_m$ for CFO estimation. Therefore, the complexity may be reduced, compared with the Fitz, L&R and M&M estimators discussed above.

As another example, embodiments may relate to a group-based CFO estimation technique, which may use design parameters $M_{min}$ and $M_{max}$ to allow greater flexibility in selecting as much phase difference as possible. Therefore, the CFO estimation performance may be improved, compared with the Broadcom estimator discussed above.

Accordingly, embodiments may provide reduced complexity by 30%-99% in comparison with the Fitz estimator, the L&R estimator, and the M&M estimator, without compromising the CFO estimation performance. In addition, although some embodiments may have a higher complexity than the Broadcom estimator, embodiments may provide improved CFO estimation performance than the Broadcom estimator, especially when the number of symbols is limited.

A CFO estimator according to embodiments may be used to obtain an estimated CFO $\hat{\omega}_c$ according to Equation (11) below:

$$\hat{\omega}_c = \frac{1}{(M_{max} - M_{min} + 1)} \sum_{m=M_{min}}^{M_{max}} \frac{1}{m} \arg\{C_m\} \quad (11)$$

In Equation 11 above, the design parameters $M_{min}$ and $M_{max}$ may be constrained as, for example, $M_{min} \geq 1$, $M_{max} \leq L$.

Embodiments may provide two examples for determining $C_m$, which may be referred to as Example 1 and Example 2.

According to Example 1, $C_m$ may be determined according to Equation (12) below:

$$C_m = R_m = \frac{1}{L-m} \sum_{i=m+1}^{L} z_i z_{i-m}^*, m \in [M_{min}, M_{max}] \quad (12)$$

Figure 4A:
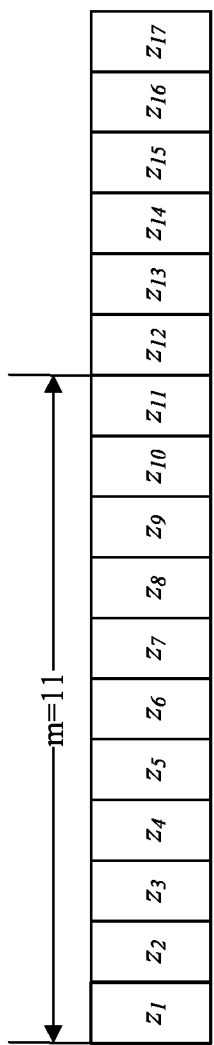
FIGS. 4A-4B are block diagrams of illustrating a process of selecting symbols to be used for performing carrier frequency offset estimation, according to embodiments.
Figure 4B:
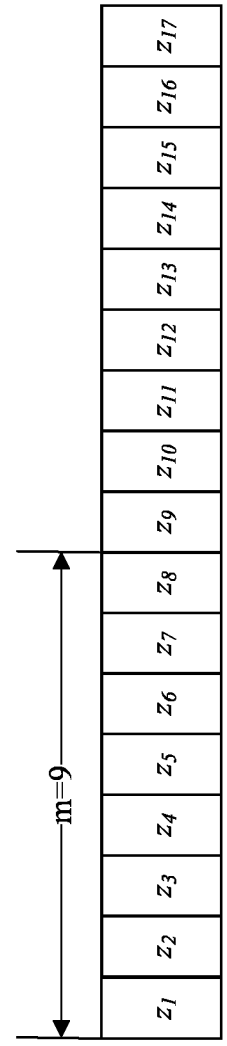

FIGS. 4A-4B are diagrams illustrating a process of selecting symbols to be used for CFO estimation using the CFO estimator according to Example 1, according to embodiments. For example, FIGS. 4A-4B show a plurality of symbol differences $Z_1$ through $z_{17}$ which may correspond to a plurality of received training symbols $r_1$ through $r_{17}$ obtained from a preamble portion 202 extracted from a signal received over communication channel 106. As can be seen in FIG. 4A, when a value of m is 11, then a signal correlation $R_{11}$ can be calculated based on a sum of $Z_{12}Z^*_1$, $Z_{13}Z^*_2$, $Z_{14}Z^*_3$, $Z_{15}Z^*_4$, $Z_{16}Z^*_5$, and $Z_{17}Z^*_6$. In addition, as can be seen in FIG. 4B, when a value of m is 9, then a signal correlation $R_9$ can be calculated based on a sum of $Z_{10}Z^*_1$, $Z_{11}Z^*_2$, $Z_{12}Z^*_3$, $Z_{13}Z^*_4$, $Z_{14}Z^*_5$, and $Z_{15}Z^*_6$, $Z_{16}Z^*_7$, and $Z_{17}Z^*_8$.

According to Example 2, $C_m$ may be determined according to Equations (13) and (14) below:

$$C_m = Y_m X_m^* \quad (13)$$

$$X_m = \frac{1}{L-m} \sum_{i=1}^{L-m} z_i, Y_m = \frac{1}{L-m} \sum_{i=m+1}^{L} z_i, m \in [M_{min}, M_{max}] \quad (14)$$

In Equations (13) and (14), $X_m$ represents an average of a first subgroup, and $Y_m$ represents an average of a second subgroup.

Figure 5A:
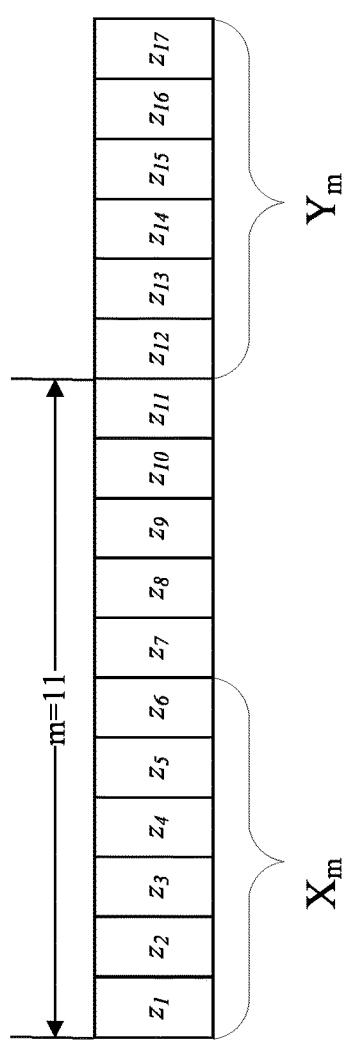
FIGS. 5A-5B are block diagrams of illustrating a process of selecting symbols to be used for performing carrier frequency offset estimation, according to embodiments.
Figure 5B:
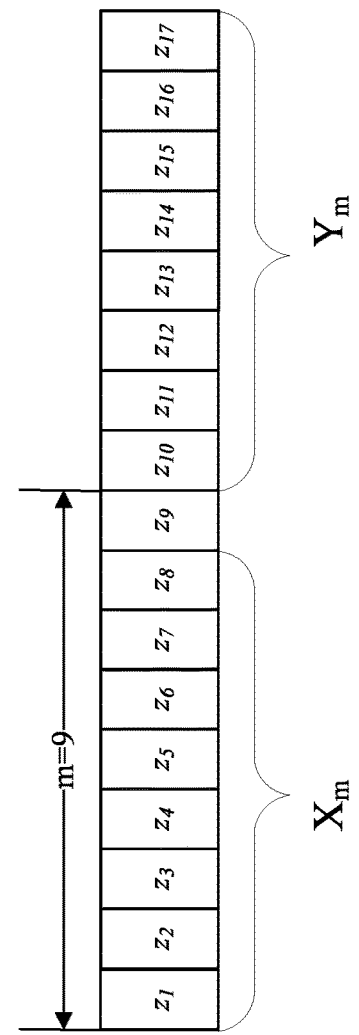
Figure 6A:
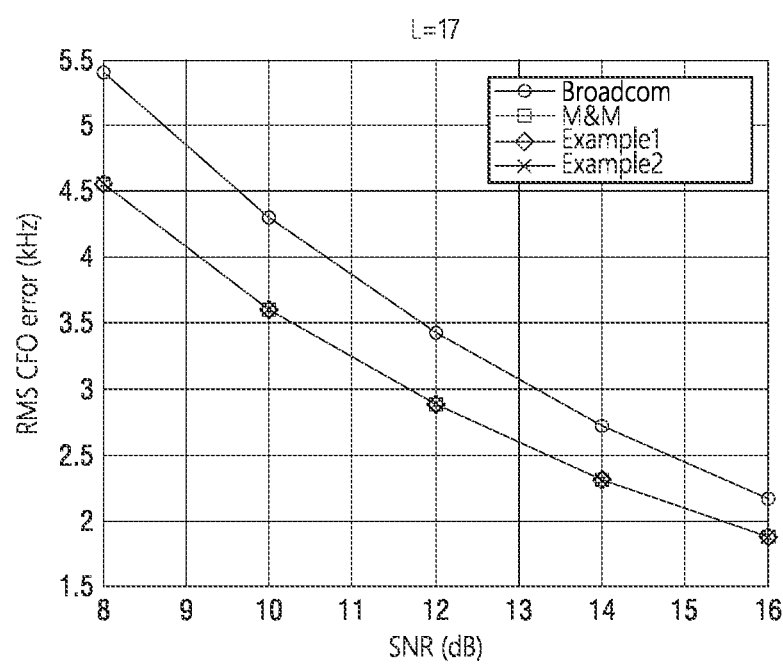
FIGS. 6A-6D are graphs illustrating examples of carrier frequency offset estimation performance, according to embodiments.
Figure 6B:
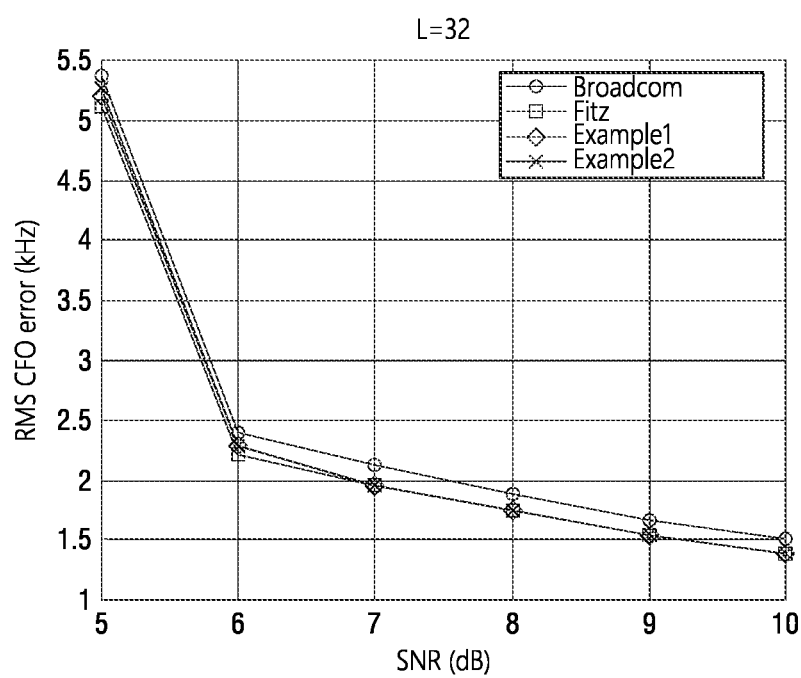
Figure 6C:
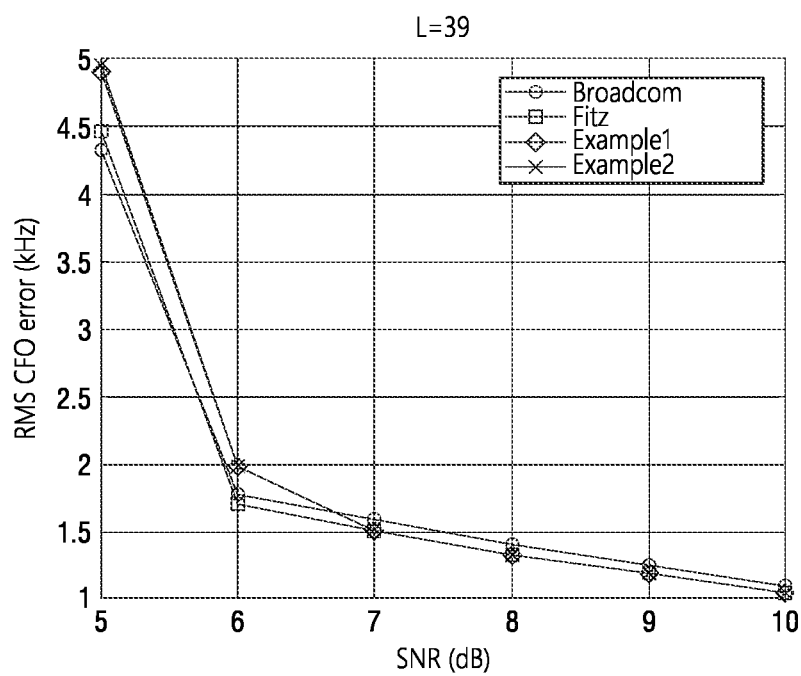
Figure 6D:
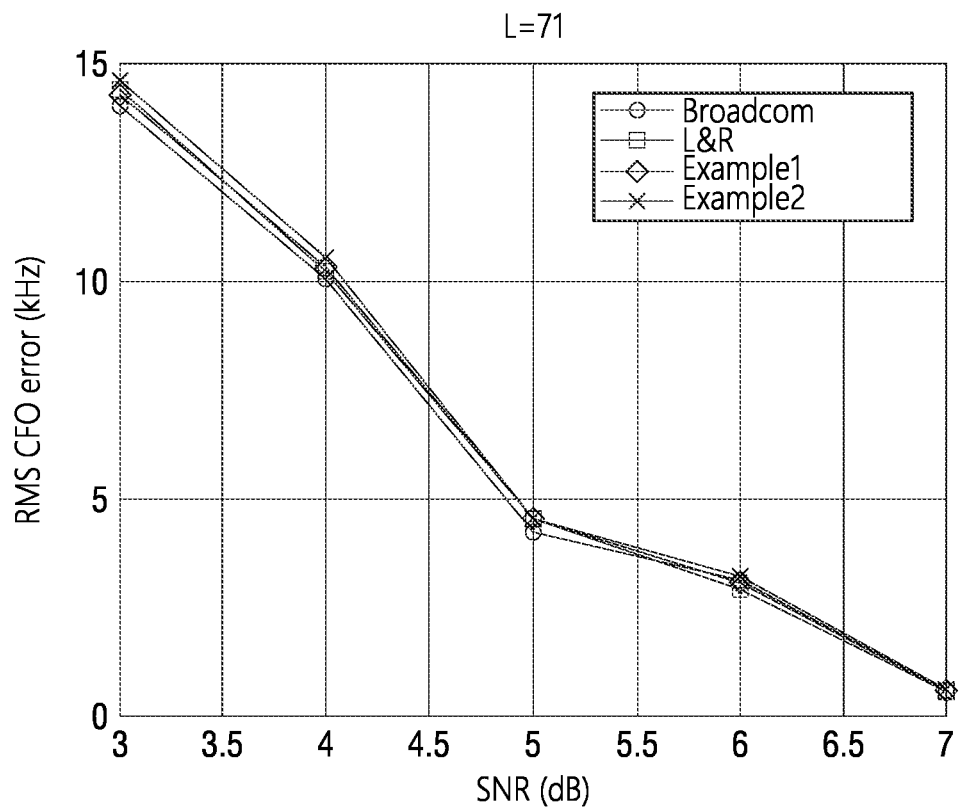

FIGS. 5A-5B are diagrams illustrating a process of selecting symbols to be used for CFO estimation using the CFO estimator according to Example 2, according to embodiments. In embodiments, FIGS. 5A-5B may correspond to Example 2 discussed above. For example, FIGS. 5A-5B show a plurality of symbol differences $z_1$ through $z_{16}$ which may correspond to a plurality of received training symbols $r_1$ through $r_{16}$ obtained from a preamble portion 202 extracted from a signal received over communication channel 106. As can be seen in FIG. 5A, when a value of m is 11, then $X_{11}$ can be calculated based on the signal differences $Z_1$ through $Z_6$, and $Y_{11}$ can be calculated based on the signal differences $Z_{12}$ through $Z_{17}$. In addition, as can be seen in FIG. 5B, when a value of m is 9, then then $X_9$ can be calculated based on the signal differences $Z_1$ through $Z_8$, and $Y_9$ can be calculated based on the signal differences $Z_{10}$ through $Z_{17}$.

In embodiments, the value of m may define the range of the true CFO estimation that can be estimated without angle ambiguity, $\omega_c \in [-\pi/m, \pi/m)$. In terms of CFO in hertz (Hz), the range may be $[-BW/(2m), BW/(2m))$, where BW represents signal bandwidth in Hz, and the symbol duration is 1/BW. In embodiments, with a careful selection of the design parameters $M_{min}$, $M_{max}$, the complexity may be reduced and the CFO estimation performance can be maintained or improved.

As can be seen above, the CFO estimation process according to the CFO estimator of Example 1 may include calculations that are performed on a symbol-by-symbol basis, and the CFO estimation process according to the CFO estimator of Example 2 may include calculations that are performed on subgroups of the symbols. Accordingly, the CFO estimator of Example 1 may be compared with the Fitz estimator, the L&R estimator, and the M&M estimator, and the CFO estimator of Example 2 may be compared with the Broadcom estimator.

A major difference between the CFO estimator of Example 1 and the Fitz estimator, the L&R estimator, and the M&M estimator, is the additional design parameters $M_{min}$, $M_{max}$. In embodiments, Example 2 may be considered to be a low complexity version of Example 1, by avoiding the calculation of $R_m$ like the Broadcom estimator. However, the CFO estimator of Example 2 may provide more flexibility when using the phase difference (e.g., between $X_m$ and $Y_m$). As discussed above, when using the Broadcom estimator, the available phase difference (e.g., between $Z_{g+1}$ and $Z_g$) is limited by the number of groups G, especially when L is small.

In embodiments, the values of the design parameters $M_{min}$ and $M_{max}$ may be selected based on a number of criteria, for example CFO estimation performance or bit/packet error rate performance. The CFO and bit/packet error rate performance can be obtained by a link-level simulator, which may be used when developing physical layer and baseband algorithms in the wireless communication industry. The selected values for the design parameters $M_{min}$ and $M_{max}$ may maximize the CFO or bit/packet error rate performance in the link-level simulations, for a given signal-to-noise ratio (SNR) and a wireless fading channel condition.

Apart from performance, the selection of the values of the design parameters $M_{min}$ and $M_{max}$ may also affect the computational complexity, as shown in Table 1. Therefore, the design parameters $M_{min}$ and $M_{max}$ may be selected to find the best trade-off between performance and complexity.

TABLE 1

Complexity of CFO estimation

| Steps | Example 1 | Example 2 |
|---|---|---|
| Number of multiplications in $C_m$ | $(4L - 2M_{max} - 2M_{min} + 1)(M_{max} - M_{min} + 1)$ | $6(M_{max} - M_{min} + 1)$ |
| Number of summations in $C_m$ | $(4L - 2M_{max} - 2M_{min})(M_{max} - M_{min} + 1)$ | |
| Number of multiplications to get $\hat{\omega}_c$ from $C_m$ | | $M_{max} - M_{min} + 2$ |
| Number of summations to get $\hat{\omega}_c$ from $C_m$ | | $M_{max} - M_{min} + 1$ |
| Number of angle calculations to get $\hat{\omega}_c$ from $C_m$ | | $M_{max} - M_{min} + 1$ |

The values of the design parameters $M_{min}$ and $M_{max}$ may depend on L and the transmitted waveform. The chosen $M_{min}$ and $M_{max}$ may be used for all signal-to-noise ratio (SNR) and wireless fading channel conditions, thus it may be easy to select the design parameters. Examples of design parameter selection for root-raised-cosine (RRC) filtered QPSK waveform can be found in Table 2.

TABLE 2

Design Parameter selection for RRC filtered QPSK waveform

| Length of Training Symbols | ($M_{min}$/$M_{max}$) |
|---|---|
| L = 17 | 6/16 |
| L = 32 | 10/30 |
| L = 39 | 20/32 |
| L = 71 | 18/30 |

CFO estimation performance may be used to evaluate various CFO estimators in an additive white Gaussian noise (AWGN) channel. The waveform used for CFO estimation is RRC filtered QPSK. The simulation results are shown in FIGS. 6A-6D, with parameters of various algorithms described in Table 3. For CFO estimators according to Example 1 and Example 2 and the Broadcom estimator, the parameters that maximize the performance for a given L have been chosen. The Fitz estimator, L&R estimator, and M&M estimator do not show much difference in simulations, and in FIG. 6A-6D, the best of them have been chosen for comparison for each L. The theoretical complexity in terms of number of multiplications and summations is summarized in Table 4. As an example, the complexity is summarized in Table 5 for the parameters given in Table 3. Because the multiplication operations dominate the complexity determination, the number of multiplications is used for comparison in Table 5.

Together with the performance results in FIGS. 6A-6D, it is found that the CFO estimators according to Example 1 and Example 2 achieve similar performance as that of the Fitz estimator, the L&R estimator and the M&M estimator in all cases, but the CFO estimator according to Example 1 reduces the complexity by 30%-70%, and the CFO estimator according to Example 2 reduces the complexity by 80%-99%. Compared with the Broadcom estimator, the CFO estimator according to Example 2 improves the estimation performance when L is small. These results indicate that the CFO estimators according to Example 1 and Example 2 achieve a desirable trade-off between estimation performance and complexity.

TABLE 3

Parameters for various estimators

| Length of Training Symbols | Proposed ($M_{min}$/$M_{max}$) | Fitz/L&R/M&M (M) | Broadcom (B/G) |
|---|---|---|---|
| L = 17 | 6/16 | 8 | 4/4 |
| L = 32 | 10/30 | 16 | 8/4 |
| L = 39 | 20/32 | 19 | 13/3 |
| L = 71 | 18/30 | 35 | 17/4 |

TABLE 4

Complexity comparisons of various CFO estimators

| Algorithms | Number of multiplications | Number of summations | Number of angle calculations |
|---|---|---|---|
| Fitz | $M(4L - 2M - 1) + 1$ | $M(4L - 2M - 1)$ | $M$ |
| L&R | $M(4L - 2M - 1) + 1$ | $M(4L - 2M)$ | 1 |
| M&M | $M(4L - 2M)$ | $M(4L - 2M)$ | $2M$ |
| Broadcom | $5G - 3$ | $2GB + 3G - 3$ | $G - 1$ |
| Example 1 | $(4L - 2M_{max} - 2M_{min} + 2)(M_{max} - M_{min} + 1) + 1$ | $(4L - 2M_{max} - 2M_{min} + 1) \cdot (M_{max} - M_{min} + 1)$ | $M_{max} - M_{min} + 1$ |
| Example 2 | $7(M_{max} - M_{min} + 1) + 1$ | | |

TABLE 5

Complexity comparisons of various CFO estimators, for L = 17/32/39/71

| Algorithms | Number of multiplications | Number of summations | Number of angle calculations |
|---|---|---|---|
| Fitz | 409/1521/2224/7456 | 408/1520/2223/7455 | 8/16/19/35 |
| L&R | 409/1521/2224/7456 | 416/1536/2242/7490 | 1 |
| M&M | 416/1536/2242/7490 | 416/1536/2242/7490 | 16/32/38/70 |
| Broadcom | 17/17/12/17 | 41/73/84/145 | 3/3/2/3 |
| Example 1 | 287/1051/703/2471 | 275/1029/689/2457 | 11/21/13/13 |
| Example 2 | 78/148/92/92 | | |

Figure 7:
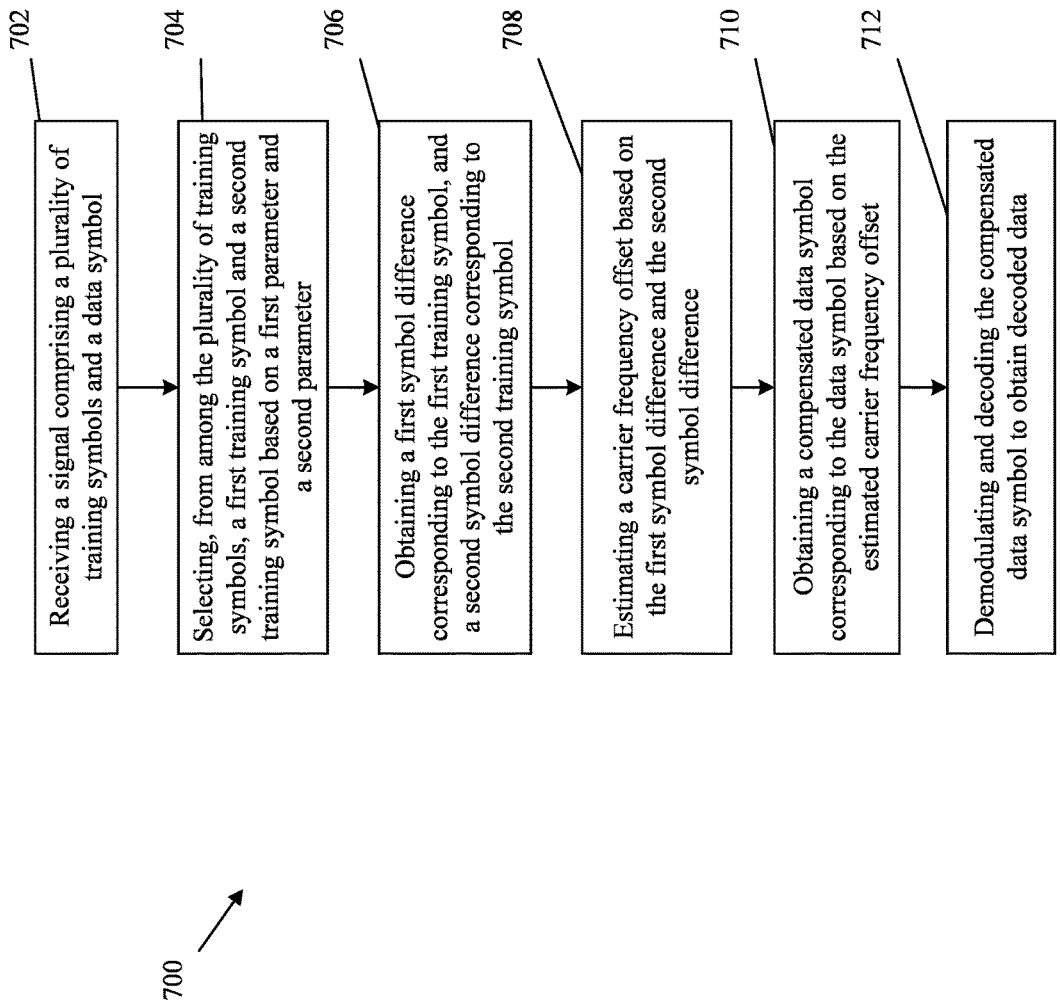
FIG. 7 is a diagram illustrating a process for estimating carrier frequency offset, according to embodiments.

FIG. 7 is a flowchart of a process 700 for performing CFO estimation, according to embodiments. In some implementations, one or more process blocks of FIG. 7 may be performed by the CFO estimation module 108 or any other element described above.

As shown in FIG. 7, at operation 702 the process 700 may include receiving a signal comprising a plurality of training symbols and a data symbol. In embodiments, the plurality of training symbols may be extracted from the preamble portion 202 of the packet 200, and the data symbol may be extracted from the data portion of the packet 200.

As further shown in FIG. 7, at operation 704 the process 700 may include selecting, from among the plurality of training symbols, a first training symbol and a second training symbol based on a first parameter and a second parameter. In embodiments, the first parameter and the second parameter may correspond to the design parameters $M_{min}$ and $M_{max}$ described above.

As further shown in FIG. 7, at operation 706 the process 700 may include obtaining a first symbol difference corresponding to the first training symbol, and a second symbol difference corresponding to the second training symbol. In embodiments, the symbol differences may correspond to the symbol differences $z_l$ described above.

As further shown in FIG. 7, at operation 708 the process 700 may include estimating a carrier frequency offset based on the first symbol difference and the second symbol difference. In embodiments, the estimated carrier frequency offset may correspond to the estimated CFO $\hat{\omega}_c$ described above.

As further shown in FIG. 7, at operation 710 the process 700 may include obtaining a compensated data symbol corresponding to the data symbol based on the estimated carrier frequency offset.

As further shown in FIG. 7, at operation 712 the process 700 may include demodulating and decoding the compensated data symbol to obtain decoded data.

In embodiments, the first symbol difference may be determined based on a difference between the first training symbol and an expected first training symbol, and the second symbol difference may be determined based on a difference between the second training symbol and an expected second training symbol. In embodiments, the first and second training symbols may correspond to the received training symbol $r_y$ discussed above, and the expected first and second training symbols may correspond to the expected training symbol pi discussed above.

In embodiments, the first training symbol and the second training symbol are separated by a symbol distance, the symbol distance may be greater than or equal to a minimum symbol distance specified by the first parameter, and the symbol distance may be less than or equal to a maximum symbol distance specified by the second parameter. In embodiments, the symbol distance may correspond to the symbol distance m discussed above.

In embodiments, the estimated carrier frequency offset may be determined based on Equation (11) discussed above, and may be determined based on at least one from among a signal correlation associated with the received signal, and a phase difference associated with the received signal.

In embodiments, the signal correlation may include a complex cross-correlation which is determined based on the first symbol difference and the second symbol difference, and may be determined based on Equation (12) discussed above.

In embodiments, the first symbol difference may be included in a plurality of first symbol differences and the second symbol difference may be included in a plurality of second symbol differences, and the phase difference may be determined based on Equations (13) and (14) discussed above.

Although FIG. 7 shows example blocks of process 700, in some implementations, the process 700 may include additional blocks, fewer blocks, different blocks, or differently arranged blocks than those depicted in FIG. 7. Additionally, or alternatively, two or more of the blocks of the process 700 may be arranged or combined in any order, or performed in parallel.

Figure 8:
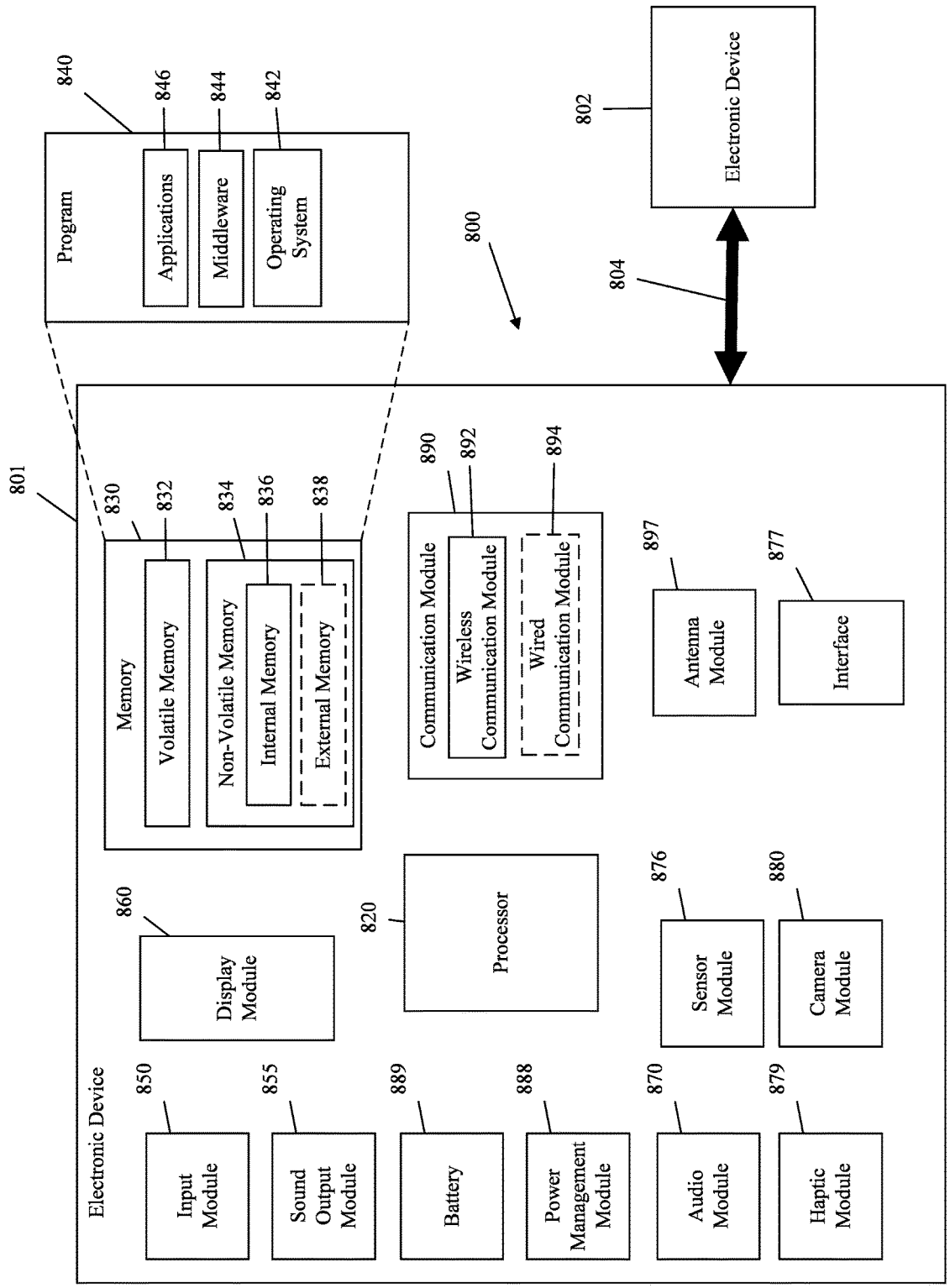
FIG. 8 is a block diagram of an electronic device, according to embodiments.

FIG. 8 is a block diagram illustrating an electronic device 801 in an environment 800 according to an embodiment. Referring to FIG. 8, the electronic device 801 in the environment 800 may communicate with an electronic device 802 via a communication channel 804. In embodiments, one or more of the electronic device 801 and the electronic device 802 may correspond to one or more of the transmitter 102 and the receiver 104 discussed above, and the communication channel 804 may correspond to the communication channel 106 discussed above.

According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, or an antenna module 897. In some embodiments, at least one of the components may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a central processing unit (CPU) or an application processor (AP), a graphics processing unit (GPU), a neural processing unit (NPU), an image signal processor (ISP), a sensor hub processor, or a communication processor (CP).

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing the communication channel 804, which may be a direct (e.g., wired) communication channel or a wireless communication channel, between the electronic device 801 and am external electronic device (e.g., the electronic device 802) and performing communication via the communication channel 804. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device 802 via the communication channel 804, which operate according to, for example a short-range communication network, such as Bluetooth™, wireless-fidelity (Wi-Fi) direct, or infrared data association (IrDA), a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 802), or a network system. According to an embodiment, the wireless communication module 892 may support a peak data rate (e.g., 20 Gbps or more) for implementing eMBB, loss coverage (e.g., 864 dB or less) for implementing mMTC, or U-plane latency (e.g., 0.5 ms or less for each of downlink (DL) and uplink (UL), or a round trip of 8 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in a communication network may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the electronic device 802 via a server coupled with the communication channel 804. The electronic device 802 may be a device of a same type as, or a different type, from the electronic device 801. According to an embodiment, all or some of operations to be executed at the electronic device 801 may be executed at the external electronic device 802. For example, if the electronic device 801 should perform a function or a service automatically, or in response to a request from a user or another device, the electronic device 801, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 802 may include an internet-of-things (IoT) device. The server may be an intelligent server using machine learning and/or a neural network. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of the embodiments and is not to be construed as limiting thereof. Although a few embodiments have been described, those skilled in the art will readily appreciate that many modifications are possible in the embodiments without materially departing from the present scope.

What is claimed is:

1. A communication device, comprising:
 a receiver configured to receive a signal comprising a plurality of training symbols and a data symbol; and
 at least one processor configured to:
  select, from among the plurality of training symbols, a first training symbol and a second training symbol based on a first parameter specifying a minimum symbol distance and a second parameter specifying a maximum symbol distance;
  obtain a first symbol difference corresponding to the first training symbol, and a second symbol difference corresponding to the second training symbol;
  estimate a carrier frequency offset based on the first symbol difference and the second symbol difference;
  obtain a compensated data symbol corresponding to the data symbol based on the estimated carrier frequency offset; and
  demodulate and decode the compensated data symbol to obtain decoded data.

2. The communication device of claim 1, wherein the first symbol difference is determined based on a difference between the first training symbol and an expected first training symbol, and
 wherein the second symbol difference is determined based on a difference between the second training symbol and an expected second training symbol.

3. The communication device of claim 1, wherein the first training symbol and the second training symbol are separated by a symbol distance, and
 wherein the symbol distance is greater than or equal to the minimum symbol distance specified by the first parameter, and
 wherein the symbol distance is less than or equal to the maximum symbol distance specified by the second parameter.

4. The communication device of claim 3, wherein the estimated carrier frequency offset is determined as follows:

$$\hat{\omega}_c = \frac{1}{(M_{max} - M_{min} + 1)} \sum_{m=M_{min}}^{M_{max}} \frac{1}{m} \arg\{C_m\},$$

wherein $\hat{\omega}_c$ represents the estimated carrier frequency offset, $M_{max}$ represents the maximum symbol distance, $M_{min}$ represents the minimum symbol distance, m represents the symbol distance, and $C_m$ represents at least one from among a signal correlation associated with the received signal, and a phase difference associated with the received signal.

5. The communication device of claim 4, wherein the signal correlation comprises a complex cross-correlation which is determined based on the first symbol difference and the second symbol difference.

6. The communication device of claim 5, wherein the signal correlation is determined as follows:

$$C_m = R_m = \frac{1}{L-m} \sum_{l=m+1}^{L} z_l z_{l-m}^*, m \in [M_{min}, M_{max}],$$

wherein $R_m$ represents the signal correlation, l represents an index, L represents a length of the plurality of training symbols, $z_l$ represents the first symbol difference, and $z_{l-m}$ represents the second symbol difference.

7. The communication device of claim 4, wherein the first symbol difference is included in a plurality of first symbol differences and the second symbol difference is included in a plurality of second symbol differences, and wherein $C_m = X_m Y_m^*$, wherein $X_m$ represents an average of the plurality of first symbol differences and $Y_m$ represents an average of the plurality of second symbol differences.

8. The communication device of claim 7, wherein $X_m$ and $Y_m$ are determined as follows:

$$X_m = \frac{1}{L-m} \sum_{l=1}^{L-m} z_l, Y_m = \frac{1}{L-m} \sum_{l=m+1}^{L} z_l, m \in [M_{min}, M_{max}],$$

wherein L represents a length of the plurality of training symbols, l represents an index, and $z_l$ represents a symbol difference.

9. A device for estimating carrier frequency offset, the device comprising:
 a memory; and
 at least one processor configured to:
  obtain a signal comprising a plurality of training symbols and a data symbol;
  estimate the carrier frequency offset based on parameters which specify a minimum symbol distance and a maximum symbol distance used to determine at least one from among a signal correlation corresponding to the plurality of training symbols, and a phase difference corresponding to the plurality of training symbols;
  obtain a compensated data symbol corresponding to the data symbol based on the estimated carrier frequency offset; and
  demodulate and decode the compensated data symbol to obtain decoded data.

10. The device of claim 9, wherein the carrier frequency offset is determined based on a first symbol difference corresponding to a first training symbol of the plurality of training symbols, and a second symbol difference corresponding to a second training symbol of the plurality of training symbols,
 wherein the first training symbol and the second training symbol are separated by a symbol distance,
 wherein the symbol distance is greater than or equal to the minimum symbol distance, and
 wherein the symbol distance is less than or equal to the maximum symbol distance.

11. The device of claim 10, wherein the signal correlation comprises a complex cross-correlation which is determined based on the first symbol difference and the second symbol difference.

12. The device of claim 10, wherein the first symbol difference is included in a plurality of first symbol differences and the second symbol difference is included in a plurality of second symbol differences, and wherein the phase difference is determined based on an average of the plurality of first symbol differences and an average of the plurality of second symbol differences.

13. A communication method for operating a communication device, the communication method being performed by at least one processor and comprising:

receiving a signal comprising a plurality of training symbols and a data symbol;

selecting, from among the plurality of training symbols, a first training symbol and a second training symbol based on a first parameter specifying a minimum symbol distance and a second parameter specifying a maximum symbol distance;

obtaining a first symbol difference corresponding to the first training symbol, and a second symbol difference corresponding to the second training symbol;

estimating a carrier frequency offset based on the first symbol difference and the second symbol difference;

obtaining a compensated data symbol corresponding to the data symbol based on the estimated carrier frequency offset; and demodulating and decoding the compensated data symbol to obtain decoded data.

14. The communication method of claim 13, wherein the first symbol difference is determined based on a difference between the first training symbol and an expected first training symbol, and wherein the second symbol difference is determined based on a difference between the second training symbol and an expected second training symbol.

15. The communication method of claim 13, wherein the first training symbol and the second training symbol are separated by a symbol distance, and wherein the symbol distance is greater than or equal to the minimum symbol distance specified by the first parameter, and wherein the symbol distance is less than or equal to the maximum symbol distance specified by the second parameter.

16. The communication method of claim 15, wherein the estimated carrier frequency offset is determined as follows:

$$\hat{\omega}_c = \frac{1}{(M_{max} - M_{min} + 1)} \sum_{m=M_{min}}^{M_{max}} \frac{1}{m} \arg\{C_m\},$$

wherein $\hat{\omega}_c$ represents the estimated carrier frequency offset, $M_{max}$ represents the maximum symbol distance, $M_{min}$ represents the minimum symbol distance, m represents the symbol distance, and $C_m$ represents at least one from among a signal correlation associated with the received signal, and a phase difference associated with the received signal.

17. The communication method of claim 16, wherein the signal correlation comprises a complex cross-correlation which is determined based on the first symbol difference and the second symbol difference.

18. The communication method of claim 17, wherein the signal correlation is determined as follows:

$$C_m = R_m = \frac{1}{L-m} \sum_{l=m+1}^{L} z_l z_{l-m}^*, \ m \in [M_{min}, M_{max}],$$

wherein $R_m$ represents the signal correlation, L represents a length of the plurality of training symbols, l represents an index, $z_l$ represents the first symbol difference, and $z_{l-m}$ represents the second symbol difference.

19. The communication method of claim 16, wherein the first symbol difference is included in a plurality of first symbol differences and the second symbol difference is included in a plurality of second symbol differences, and wherein $C_m = X_m Y_m^*$, wherein $X_m$ represents an average of the plurality of first symbol differences and $Y_m$ represents an average of the plurality of second symbol differences.

20. The communication method of claim 19, wherein $X_m$ and $Y_m$ are determined as follows:

$$X_m = \frac{1}{L-m} \sum_{l=1}^{L-m} z_l, \ Y_m = \frac{1}{L-m} \sum_{l=m+1}^{L} z_l, \ m \in [M_{min}, M_{max}],$$

wherein L represents a length of the plurality of training symbols, l represents an index, and $z_l$ represents a symbol difference.

* * * * *